(12) United States Patent
Weber

(10) Patent No.: US 6,479,953 B2
(45) Date of Patent: Nov. 12, 2002

(54) DEFLECTION CIRCUIT WITH A RETRACE CAPACITIVE TRANSFORMATION

(75) Inventor: Rudy Weber, Meilen (CH)

(73) Assignee: Thomson Licensing S. A., Boulogne (FR)

( * ) Notice: Subject to any disclaimer, the term of this patent is extended or adjusted under 35 U.S.C. 154(b) by 0 days.

(21) Appl. No.: 09/892,112

(22) Filed: Jun. 26, 2001

(65) Prior Publication Data

US 2002/0060531 A1 May 23, 2002

Related U.S. Application Data

(60) Provisional application No. 60/228,231, filed on Aug. 25, 2000.

(51) Int. Cl.[7] .................................................. H01J 29/70
(52) U.S. Cl. ........................ 315/408; 315/371; 315/399
(58) Field of Search ................................ 315/399, 364, 315/388–398, 366, 408, 371, 370

(56) References Cited

U.S. PATENT DOCUMENTS

| | | | |
|---|---|---|---|
| 4,104,567 A | 8/1978 | Peer et al. ................... | 315/382 |
| 4,147,964 A | 4/1979 | Luz et al. .................... | 315/411 |
| 4,206,388 A | 6/1980 | Ishigaki et al. ............. | 315/371 |
| 4,242,714 A | 12/1980 | Yoshida et al. ............. | 361/152 |
| 4,513,228 A | 4/1985 | Teuling ....................... | 315/408 |
| 4,540,933 A | 9/1985 | Teuling ....................... | 323/271 |
| 4,733,141 A | 3/1988 | Watanuki .................... | 315/371 |
| 4,837,457 A | 6/1989 | Bergstrom et al. .......... | 307/253 |
| 4,864,197 A | 9/1989 | Fitzgerald ................... | 315/408 |
| 5,416,389 A | 5/1995 | Merlo et al. ................. | 315/370 |
| 5,714,849 A * | 2/1998 | Lee ............................. | 315/408 |
| 6,124,686 A * | 9/2000 | Kikuchi et al. ............. | 315/408 |

FOREIGN PATENT DOCUMENTS

JP 10-108034 4/1998

OTHER PUBLICATIONS

Schematic Diagram 1999 of Sony AE–5 Television Receiver Chassis Model KV–2PFX65.

* cited by examiner

Primary Examiner—Don Wong
Assistant Examiner—Wilson Lee
(74) Attorney, Agent, or Firm—Joseph S. Tripoli; Harvey D. Fried; Sammy S. Henig

(57) ABSTRACT

A horizontal deflection circuit of a video display includes a first retrace capacitance and a second retrace capacitance. A deflection winding is coupled to the first and second retrace capacitances to form a resonant circuit, during retrace. A first switching transistor is coupled to the first retrace capacitance for generating a resonant, first retrace pulse voltage in the resonant circuit. In a first embodiment of the invention, a second switching transistor is responsive to the first retrace pulse voltage and coupled to the second retrace capacitance for controlling the second switching transistor in accordance with the first retrace pulse voltage. A second retrace pulse voltage is generated in the second retrace capacitance in a manner to provide for capacitance transformation. In a second embodiment of the invention, a second switching transistor is coupled to the second retrace capacitance for generating a second retrace pulse voltage in the second retrace capacitance in a manner to provide for capacitance transformation. A modulator is used for modulating a deflection current in the deflection winding without substantially varying a phase difference between said first and second retrace pulse voltages to provide for East-West raster distortion correction.

9 Claims, 3 Drawing Sheets

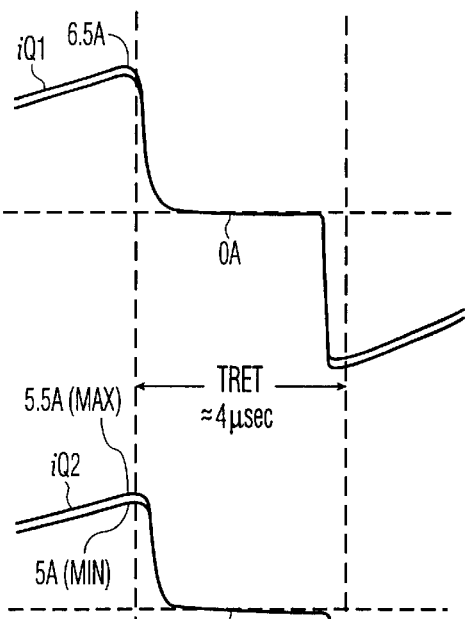
FIG. 2a
FIG. 2b
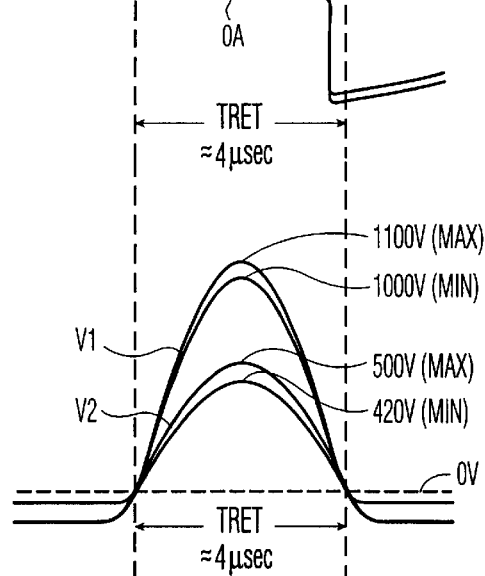
FIG. 2c
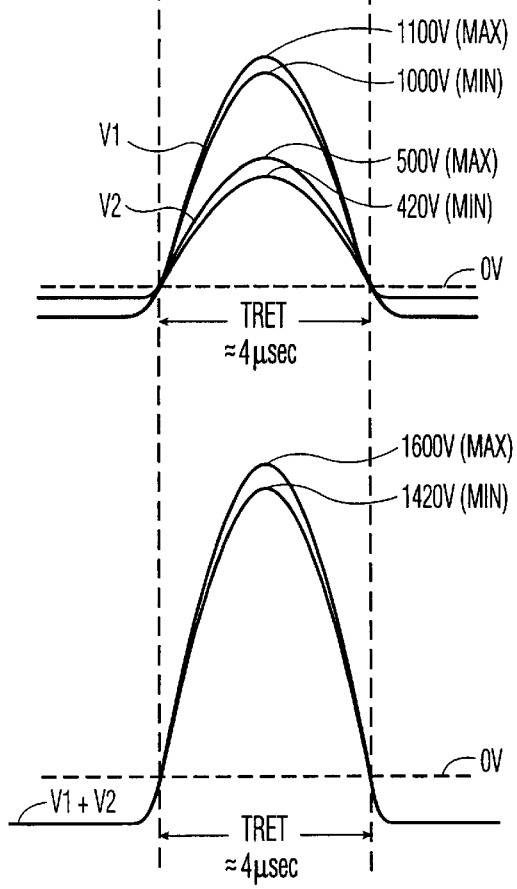
FIG. 2d

DEFLECTION CIRCUIT WITH A RETRACE CAPACITIVE TRANSFORMATION

CROSS REFERENCE TO RELATED APPLICATIONS

This application claims priority of U.S. provisional application No. 60/228,231 filed Aug. 25, 2000.

The invention relates to a deflection circuit of a cathode ray tube (CRT).

BACKGROUND

A typical horizontal deflection circuit for a CRT includes a horizontal deflection winding of a deflection yoke coupled in parallel with a retrace capacitance provided by, for example, a retrace capacitor. A horizontal output or switching transistor operating at a horizontal deflection frequency is coupled across the retrace capacitor. A supply voltage is coupled to the switching transistor and to the retrace capacitor via a supply inductance.

For a given deflection winding inductance and a supply voltage magnitude, the effective retrace capacitance required to produce the same deflection current amplitude would have to be smaller when a higher deflection frequency is utilized than when a lower deflection frequency is utilized. Therefore, the flyback pulse voltage developed across a horizontal output transistor would have to be higher at the higher deflection frequency. For a given switching transistor breakdown voltage characteristic, the maximum flyback pulse voltage that is permitted to develop across a horizontal output transistor limits the allowable, maximum horizontal frequency that can be utilized. Therefore, it may be desirable to reduce the effective retrace capacitance without substantially increasing the flyback pulse voltage developed across the horizontal output transistor.

A horizontal deflection circuit, embodying an inventive feature, includes switched, first and second retrace capacitors coupled in series with a deflection winding. First and second switching transistors are coupled across the first and second retrace capacitors, respectively. A supply voltage is coupled via a supply inductance to a junction terminal between the retrace capacitors. The switching transistors are switched off, during retrace, to produce a first retrace pulse voltage across the first retrace capacitance and a second retrace pulse voltage across the second retrace capacitance. The retrace pulse voltage across the deflection winding is equal to the sum of a first retrace pulse voltage and the second retrace pulse voltage and is larger than each. The retrace pulse voltage across the deflection winding is proportional to a ratio of the capacitances of the first and second capacitances. Thereby, capacitive transformation is obtained. Similarly, a voltage across an S-shaping capacitor that is coupled in series with the deflection winding is also proportional to a ratio of the capacitances of the first and second capacitances.

Advantageously, the peak voltage developed across each of the switching transistors is substantially smaller than the sum retrace pulse voltage developed across the deflection winding. The result is that, for a given switching transistor breakdown voltage characteristic, the maximum scan frequency that can be employed is, advantageously, higher than in a deflection circuit in which the entire retrace pulse voltage across the deflection winding is developed across a single switching transistor.

A horizontal deflection circuit, embodying an inventive feature, includes an East-West raster distortion correction circuit for correcting pincushion raster distortion. Switched, first and second retrace capacitors are provided for providing the aforementioned capacitive transformation. Throughout a given vertical trace interval, the retrace switching timing of each one of the switching transistors remains the same relative to that of the other one of the switching transistors. Thereby, advantageously, East-West raster distortion correction is obtained in a manner that avoids producing retrace time modulation.

SUMMARY OF THE INVENTION

A video display deflection apparatus, embodying an inventive feature, includes a first retrace capacitance and a second retrace capacitance. A deflection winding is coupled to the first and second retrace capacitances to form a resonant circuit with the first and second retrace capacitances, during retrace. A first switching transistor is coupled to the first retrace capacitance for generating a first retrace pulse voltage in the resonant circuit. A second switching transistor is coupled to the second retrace capacitance for generating a second retrace pulse voltage in the second retrace capacitance. The first and second retrace pulse voltage are applied to the deflection winding in a manner to provide for retrace capacitance transformation. The second switching transistor is responsive to the first retrace pulse voltage for controlling, in accordance with the first retrace pulse voltage, when a switching operation occurs in the second switching transistor.

BRIEF DESCRIPTION OF THE DRAWING

FIGS. 1a and 1c illustrate a combined deflection circuit, embodying a second inventive feature; and FIGS. 2a, 2b, 2c and 2d illustrate waveforms useful for explaining the operation of the combined circuit of FIGS. 1a and 1b.

DETAILED DESCRIPTION OF THE PREFERRED EMBODIMENT

Figure 1A:
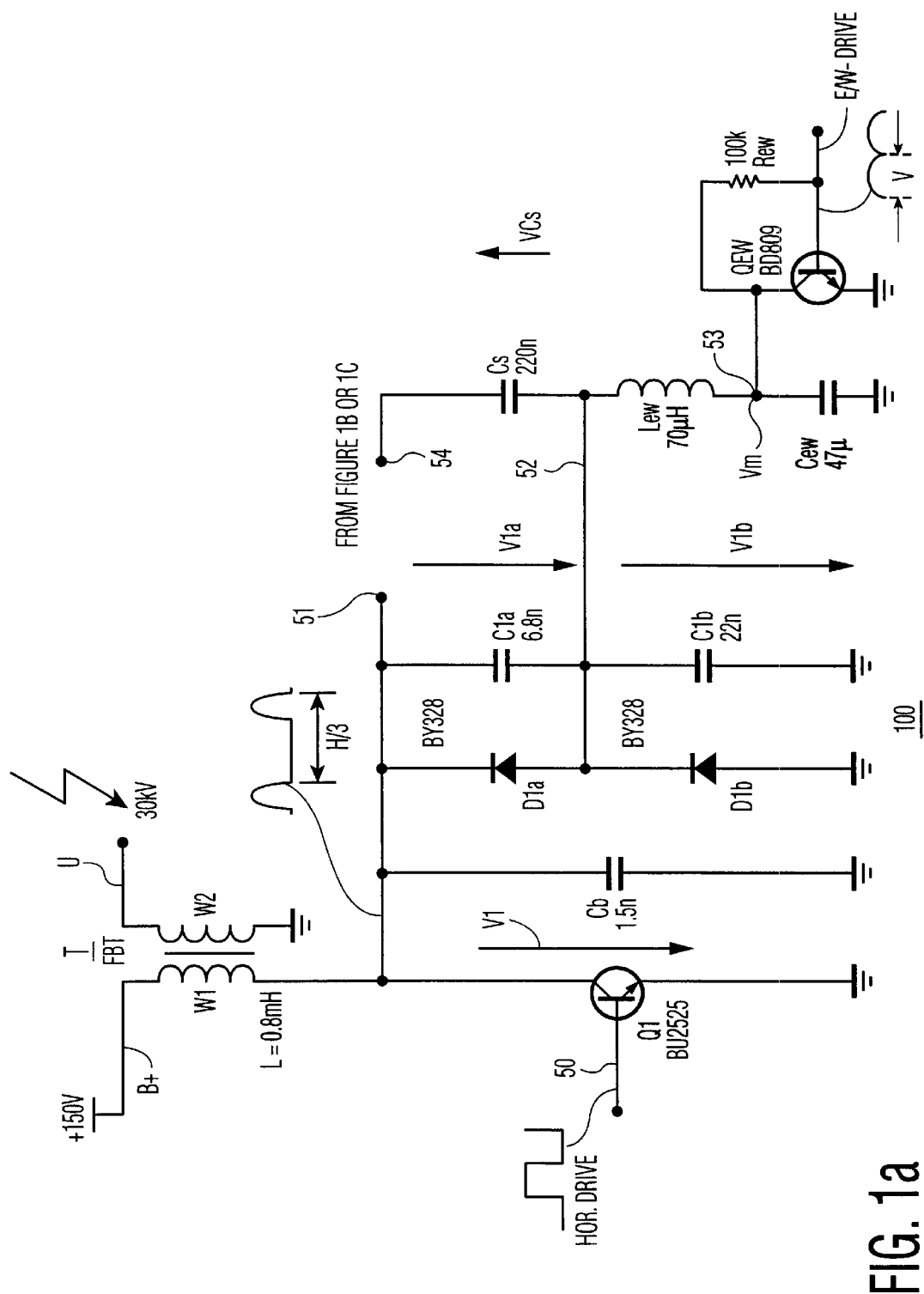
FIGS. 1a and 1b illustrate a combined deflection circuit, embodying a first inventive feature.
Figure 1B:
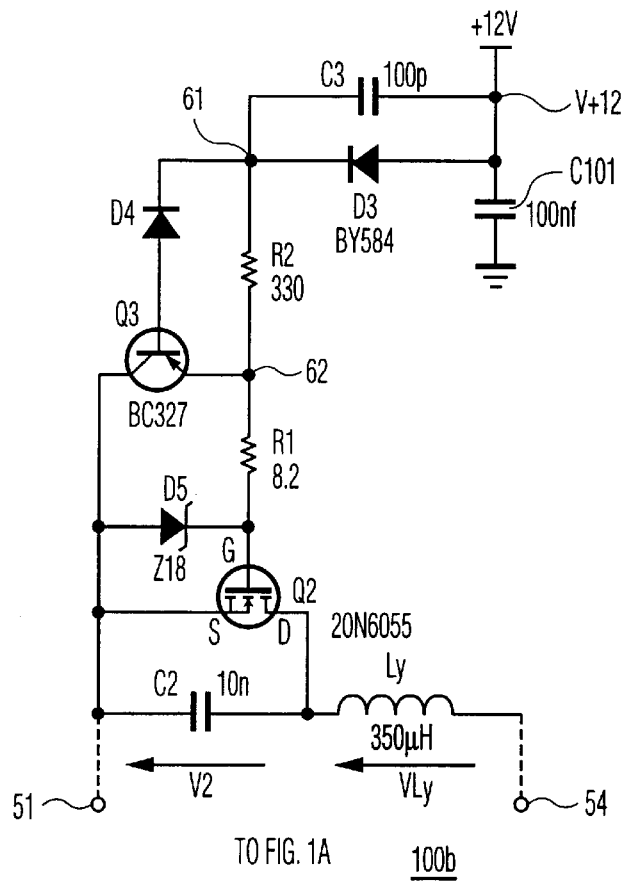

A deflection circuit 100 of FIG. 1a, when combined with an arrangement 100b of FIG. 1b, operates at a horizontal frequency of 3 times fH and a period one third of H. The term fH denotes the horizontal frequency in a television standard such as 15,525 KHz. Similarly, the term H denotes the horizontal period in the television standard.

Deflection circuit 100 of FIG. 1a includes a primary winding W1 coupled to a source of a constant value supply voltage B+. Winding W1 of a conventional flyback transformer T is also coupled to a horizontal output or switching transistor Q1 controlled by a horizontal drive signal 50 having approximately 50% duty cycle. An emitter voltage of transistor Q1 is at a common conductor potential, or ground. A junction terminal 51 of winding W1 and a collector of transistor Q1 is coupled to a retrace capacitor C1a. A retrace capacitor Cb is coupled to terminal 51 and in parallel with transistor Q1. A terminal 52 of capacitor C1a is coupled to a retrace capacitor C1b. A conventional damper diode D1a is coupled in parallel with capacitor C1a. A conventional damper diode D1b is coupled in parallel with capacitor C1b. Junction terminal 52 is coupled to a conventional East-West modulation inductor Lew. Inductor Lew has a terminal 53 that is coupled to a collector of a conventional East-West modulation and to a conventional filter capacitor Cew to form a diode modulator. Transistor QEW is controlled in a conventional manner by a vertical rate East-West modulation signal E/W-DRIVE having a period V. Period V denotes the vertical period in the television standard such as 16.6 milisecond. A feedback resistor transistor Rew is coupled between the collector and base of transistor QEW to provide operation in class A mode of operation. A vertical rate modulation voltage Vm is developed at terminal 53, in a conventional manner. A conventional S-shaping capacitor Cs is coupled between terminal 52 and a terminal 54.

A deflection winding Ly of FIG. 1*b* is coupled to a switched, retrace capacitor C2 to form a series arrangement between terminals 51 and 54. A switching transistor Q2 is coupled in parallel with capacitor C2 for switching capacitor C2. A return recovery current in transistor Q2 is performed by the operation of an integrally formed damper diode, not shown, formed with transistor Q2 in the same integrated circuit.

FIGS. 2*a*–2*d* illustrate waveforms useful for explaining the operation of the circuit of FIGS. 1*a* and 1*b*. Each waveform is applicable to a corresponding horizontal period H/3. Similar symbols and numerals in FIGS. 1*a*, 1*b* and 2*a*–2*d* indicate similar items or functions.

Transistor Q1 of FIG. 1*a* is turned off to form a retrace resonant circuit that includes deflection winding Ly of FIG. 1*b* and capacitor C1*a* of FIG. 1*a*, during retrace. A resonant retrace pulse voltage V1 having a period H/3 is developed at terminal 51 of winding Ly. As shown in FIG. 2*c*, Voltage V1 is generated when a collector current iQ1 of FIG. 2*a* of transistor Q1 of FIG. 1*a* abruptly drops to zero. Pulse voltage V1 of FIG. 2*c* is coupled to transformer T of FIG. 1*a* for producing an ultor voltage U.

In carrying out an inventive feature, pulse voltage V1 developed at terminal 51 is applied to a current path formed by a power supply filter capacitor C101, a capacitor C3, a resistor R2, a resistor R1 and an internal gate-source capacitance, not shown, of transistor Q2. A supply voltage V+12 of 12V is developed in capacitor C101. As a result of pulse voltage V1, a positive voltage is produced at a terminal 62 of resistor R2 relative to that at a terminal 61 of resistor R2. Resistor R2 is coupled between an emitter of transistor Q3 and terminal 61. Terminal 62 forms a junction terminal for the emitter of a transistor Q3, resistor R1 and resistor R2. The voltage produced at terminal 61 of resistor R2 is coupled to the base of transistor Q3 via a diode D4 when diode D4 is forward biased to turn on transistor Q3.

When transistor Q3 is turned on, a positive charged, gate-source capacitance, not shown, of transistor Q2 that maintains transistor Q2 conductive is quickly discharged via a current path formed by transistor Q3 and resistor R1. Then, transistor Q2 turns off and remains in the turned-off state for the entire remainder of a retrace interval TRET of FIGS. 2*a*–2*d*. Thereby, a retrace pulse voltage V2 of FIG. 1*b* is generated in capacitor C2. Voltage V2 of FIG. 2*c* is generated when a collector current iQ2 of FIG. 2*b* of transistor Q2 of FIG. 1*b* abruptly drops to zero.

A combined retrace pulse voltage VLy, developed across deflection winding Ly of FIG. 1*a*, is equal to the sum of retrace pulse voltage V1*a* of FIG. 1*a*, developed in retrace capacitor C1*a*, and retrace pulse voltage V2 of FIG. 1*b*, developed in retrace capacitor C2. Pulse voltage VLy is larger than each of pulse voltage V2 and pulse voltage V1*a* of FIG. 1*a*. Thereby, advantageously, the peak of pulse voltages V1, developed across switching transistor Q1, is substantially smaller than voltage VLy. Therefore, for a given inductance of winding Ly of FIG. 1*b* and a breakdown voltage of switching transistor Q1 of FIG. 1*a*, the scan frequency that can be employed is advantageously higher. The scan frequency that can be employed is higher than if retrace pulse voltage VLy of FIG. 1*b* were developed entirely across switching transistor Q1 of FIG. 1*a*. The result is that retrace capacitor transformation is obtained.

Circuit 100 of FIG. 1*a* that is coupled to circuit 100*b* of FIG. 1*b* provides capacitive transformation that is, advantageously, constant throughout vertical trace. For simplification purposes assume that the inductance of winding W1 is large or infinite. Thus, an average voltage VCs across capacitor Cs of FIG. 1*a* can be expressed as follows:

average of voltage $VCs = $ (the difference between voltages $B, +VmAv$)

$$x \cdot \left(1 + \frac{\text{the value of capacitor } C1a}{\text{the value of capacitor } C2}\right).$$

The term VmAv represents the average value of voltage Vm. The term $$\left(1 + \frac{\text{the value of capacitor } C1a}{\text{the value of capacitor } C2}\right)$$

represents the capacitive transformation factor.

Thus, because of retrace capacitor transformation, measured by the aforementioned capacitive transformation factor, voltage VCs is larger for a given difference between voltage B+ and the average value of voltage Vm. The increased average value of voltage VCs enables the generation of a given amplitude of deflection current iy at a higher deflection frequency. Also, because of retrace capacitor transformation, the effective retrace capacitance is smaller. Smaller retrace capacitance results in a shorter retrace interval TRET of FIGS. 2*a*–2*d*.

During the first half of trace, diodes D1*a* and D1*b* are conductive in a conventional manner. Additionally, the integrally formed damper diode, not shown, of transistor Q2 of FIG. 1*b* is also conductive. During the second half of trace, transistor Q1 of FIG. 1*a* is turned on, in a conventional manner.

As soon as damper diodes D1*a* and D1*b* of FIG. 1*a* and the integrally formed diode, not shown, of transistor Q2 of FIG. 1*b* become conductive, terminal 51 of FIG. 1*a* is clamped to ground potential. Voltage V+12 is applied via a diode D3 of FIG. 1*b* coupled in parallel with capacitor C3. Consequently, diode D3 becomes forward biased, transistor Q3 turns off and a current, not shown, charges the gate-source capacitance, not shown, of transistor Q2 via resistors R2 and R1. Diode D4 prevents transistor Q3 from conducting via reverse base-emitter voltage.

After a short delay time determined by the gate-source capacitance, not shown, of transistor Q2, transistor Q2 is turned on to form a low drain-source resistance. This low resistance is placed in parallel with the integrally formed, forward biased damper diode, not shown, of transistor Q2 for a portion of the trace interval similar to the turn on interval in transistor Q1 of FIG. 1*a*. Diode D5 of FIG. 1*b* protects transistor Q2 from excessive gate voltage.

In carrying out another inventive feature, a phase between retrace voltage V1 of FIG. 2*c* and retrace voltage V2 remains the same in each horizontal deflection cycle, throughout vertical interval V. The result is that retrace interval TRET has the same width, throughout vertical interval V. Thereby, advantageously, retrace time modulation is avoided.

Figure 1C:
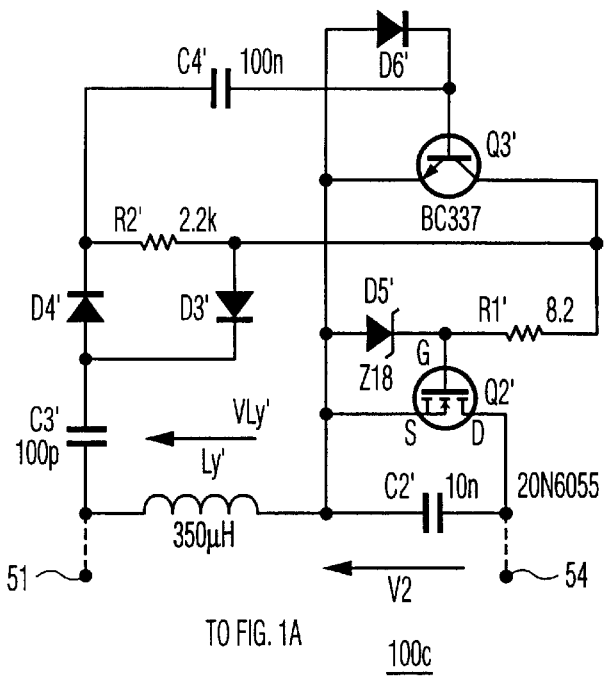

In a second alternative, deflection circuit 100 of FIG. 1*a* is coupled to the arrangement of a booster circuit 100*c* of FIG. 1c, instead of circuit 100b in FIG. 1b. Similar symbols and numerals in FIG. 1c, except for the prime symbol ('), and in FIGS. 1a, 1b and 2a–2d indicate similar items or functions.

Deflection winding Ly' of FIG. 1c is interposed between a capacitor C2' and capacitor C1a of FIG. 1a. Advantageously, circuit 100c of FIG. 1c divides a retrace pulse voltage VLy', across winding Ly', into a positive voltage with respect to ground, at terminal 51, and a symmetrical, negative voltage with respect to ground, at terminal 54. Thus, a symmetrically driven arrangement is provided. The peak of each retrace pulse voltage at terminals 51 and 54 with respect to ground is smaller than the peak of their sum. Therefore, advantageously, less demanding electrical isolation is required than in the combined arrangement of FIGS. 1a and 1b that provides a non-symmetrically driven arrangement.

A capacitor C3' of FIG. 1c is used for sensing an occurrence of retrace pulse voltage V1 at terminal 51, similarly to the way done in FIG. 1b. A forward biased diode D4' of FIG. 1c coupled in series with capacitor C3' and a capacitor C4' causes a transistor Q3' to conduct by charging capacitor C4'. Consequently, a positive charged gate-source capacitance, not shown, of a transistor Q2' is quickly discharged via a resistor R1' and transistor Q3'. Transistor Q2' turns off and remains turned off for the entire remainder of retrace. During a second half of horizontal retrace, when voltage V1 of FIG. 2c decreases from its peak magnitude, capacitor C3' FIG. 1c discharges via a diode D3', resistor R1', a forward biased D5' and deflection winding Ly'. Diode D3 is coupled in an anti-parralel manner with respect to diode D4'. Because capacitor C4' is not included in the retrace discharge current path of capacitor C3', the energy in capacitor C4' is maintained stored, during retrace. Transistor Q3' remains non-conductive because no base current is produced, during the second half of retrace.

As soon as capacitor C3' is discharged completely, indicating the end of retrace, capacitor C4' starts discharging. A diode D6' that is coupled between the base of transistor Q3' and winding Ly' is forward biased. Capacitor C4', now a voltage source, charges the gate-source capacitance, not shown, of transistor Q2' via a resistor R2'. Transistor Q2' turns on after a delay time similar to that in FIG. 1b. A diode D5' also performs similar protection function to that described with respect to diode D5 in FIG. 1b.

What is claimed is:

1. A video display deflection apparatus, comprising:
   a first retrace capacitance;
   a second retrace capacitance;
   a deflection winding coupled to said first and second retrace capacitances to form a resonant circuit with said first and second retrace capacitances, during retrace;
   a first switching transistor coupled to said first retrace capacitance for generating a first retrace pulse voltage in said resonant circuit; and
   a second switching transistor coupled to said second retrace capacitance for generating a second retrace pulse voltage in said second retrace capacitance, said first and second retrace pulse voltages being applied to said deflection winding in a manner to provide for retrace capacitance transformation, said second switching transistor being responsive to a timing signal produced by said first switching transistor for controlling, in accordance with said timing signal, a switching of frequencies of said second switching transistor.

2. A video display deflection apparatus according to claim 1, further comprising an East-West modulator responsive to a periodic, control signal having a frequency related to a vertical deflection frequency for modulating a deflection current in said deflection winding, wherein a phase difference between said first and second retrace pulse voltages remains substantially the same, during a vertical trace interval.

3. A video display deflection apparatus according to claim 2, wherein said East-West modulator includes a diode modulator.

4. A video display deflection apparatus according to claim 1, wherein said first and second retrace capacitances are coupled in series to form a circuit branch that is coupled in parallel with said deflection winding.

5. A video display deflection apparatus according to claim 1, wherein said first retrace pulse voltage is developed in said first retrace capacitance.

6. A video display deflection apparatus, comprising:
   a first retrace capacitance;
   a second retrace capacitance;
   a deflection winding coupled to said first and second retrace capacitances to form a resonant circuit with said first and second retrace capacitances, during retrace;
   a first switching transistor responsive to an input signal at a frequency related to a first deflection frequency and coupled to said first retrace capacitance for generating a resonant, first retrace pulse voltage in said first retrace capacitance;
   a second switching transistor responsive to said input signal and coupled to said second retrace capacitance for generating a second retrace pulse voltage in said second retrace capacitance, said second and first retrace pulse voltages being coupled to said deflection winding to produce a deflection current in said deflection winding in a manner to provide for retrace capacitance transformation; and
   a modulator responsive to a periodic control signal having a frequency related to a second deflection frequency for modulating a deflection current in said deflection winding to provide for raster distortion correction without varying a phase difference between said first and second retrace pulse voltages, during a period of said control signal.

7. A video display deflection apparatus according to claim 6, wherein said modulator provides for East-West raster distortion correction.

8. A video display deflection apparatus according to claim 6, wherein said second switching transistor is responsive to said first retrace pulse voltage for controlling, in accordance with said first retrace pulse voltage, when a switching operation occurs in said second switching transistor.

9. A video display deflection apparatus according to claim 6, wherein said first and second retrace capacitances are coupled in series to form a circuit branch that is coupled in parallel with said deflection winding.

* * * * *